United States Patent [19]

Tisdale

[11] 4,147,212

[45] Apr. 3, 1979

[54] CONTROL OF HYDROGEN SULFIDE GAS TO REDUCE TOXICITY AND CORROSION DUE TO EXPOSURES THERETO

[75] Inventor: Vernon R. Tisdale, Homewood, Ill.

[73] Assignee: The Sherwin-Williams Co., Cleveland, Ohio

[21] Appl. No.: 890,371

[22] Filed: Mar. 27, 1978

[51] Int. Cl.$^2$ .................. B01D 53/34; C01B 17/20; C01G 9/08; C09K 7/04
[52] U.S. Cl. .................. 166/244 C; 175/64; 252/8.5 B; 252/8.55 E; 252/387; 423/232
[58] Field of Search ............... 423/220, 232, 233, 242, 423/561 B; 166/244 C; 175/64, 66; 252/8.5 B, 8.5 A, 8.55 E, 387

[56] References Cited

U.S. PATENT DOCUMENTS

| | | | |
|---|---|---|---|
| 1,916,980 | 7/1933 | Horvitz | 423/232 |
| 2,019,468 | 10/1935 | Bacon | 423/232 |
| 2,073,413 | 3/1937 | Cross et al. | 252/8.5 B |
| 2,429,593 | 10/1947 | Case | 252/8.55 E |
| 3,506,572 | 4/1970 | Van Dyke et al. | 252/8.5 B |
| 3,701,824 | 10/1972 | Prahacs et al. | 423/232 X |
| 3,896,212 | 7/1975 | Eickmeyer | 423/232 X |
| 3,928,211 | 12/1975 | Browning et al. | 175/64 X |
| 4,073,860 | 2/1978 | Huggins et al. | 423/561 B X |
| 4,089,653 | 5/1978 | Ward | 423/232 X |

Primary Examiner—Stephen J. Novosad
Attorney, Agent, or Firm—Richard G. Smith; James V. Tura

[57] ABSTRACT

Hydrogen sulfide, sometimes referred to as "rotten egg" gas occurs commonly in nature, particularly about oil and gas wells in drilling, completing and working over of wells and is dangerously toxic to workmen and devastatingly corrosive to bore hole casings and drilling equipment. It also contaminates natural gas produced by some wells.

Here it has been found that a water soluble zinc ammonium carbonate complex provides nearly quantitative removal of hydrogen sulfide by intimately contacting the carrier thereof with substantially stoichiometric qualities of said complex in aqueous solution.

5 Claims, No Drawings

CONTROL OF HYDROGEN SULFIDE GAS TO REDUCE TOXICITY AND CORROSION DUE TO EXPOSURES THERETO

This invention provides use of a little known and used zinc complex, principally zinc tetra ammonium carbonate, which is water soluble and exists at very high pH levels, to be used in the removal of hydrogen sulfide contamination and about well drilling, natural gas producing wells, and well bore hole maintenance operations. Prompt removal of $H_2S$ from the well itself and the discard pits is essential to the health of on-the-spot labor (hydrogen sulfide is most noxious) and the prevention of corrosion of the drilling tools, contact drill pipe and well casings. Dissolved gases, including $H_2S$ and $CO_2$ are most often encountered in drilling conditions and present serious problems if not promptly controlled. Natural gas production often is seriously reduced when the product gas is contaminated with $H_2S$. It is desirable to maintain the concentration of contaminant hydrogen sulfide at a level of less than 1 and preferably less than 0.5 and, if economically and practically feasible, at less than 0.2 parts per million of the carrier thereof, drilling fluid, natural gas, or packing fluid, for example.

So far as is known, these are difficult levels to reach when solid additives, insoluble in the aqueous portions of drilling fluids as in the art, are used. As far as has been determined, it is the practice to keep drilling fluids at a high pH, 11 to 11.5 has been reported to be a favored range, for it is well known that corrosion in aqueous systems is substantially reduced in a strong alkaline environment. All of the presently known commercial zinc compounds useful in the art are, or are from, precipitated solids at pH ranges of this order and are used as slurries in the drilling muds or fluids or sulfide gas absorbers associated with the subject art.

Obviously, slurries of solid particulate matter are less reactive with $H_2S$ in a gaseous phase or as a gas dissolved in an aqueous system. As the foregoing is a generally accepted fact, it is not surprising to find that the highly basic zinc complex, zinc tetra ammonium carbonate, reacts faster and more completely with $H_2S$ than compounds heretofore used in the prior art. It also follows that the more quickly and completely the entrained, dissolved or occluded $H_2S$ is rendered inocuous by precipitation, the less opportunity for adverse reaction on the humans who may be in near proximity thereto in the field and the greater inhibition of corrosion of ferrous tools, equipment and casings associated with well drilling and its associated operations or gas products produced therefrom.

A further practical value has been noted in the field that a sulfide scavenger in liquid form, of known concentration of active ingredient, could be readily pumped and metered and used in controlled fashion to keep the cost of the operation minimal and allow greater leeway in the processes used from $H_2S$ removal by intimate contact with the active component in aqueous solution.

While the invention has been reduced to practice by its addition to an aqueous drilling mud, it is also known to add alkaline materials to brine to inhibit and prevent corrosion of the equipment. Drilling muds are known to be made somewhat specific for given field conditions but that they are of the oil base type, the water base type and also emulsion types. Use of the water soluble zinc tetra ammonium carbonate is preferred in the water and emulsion types where the system is electroconductive, or water is the continuous or external phase.

It is further well known that drilling muds are usually made to be viscous, heavy and thixotropic through use of natural clays, bentonite, fullers earth, barytes, ion oxide, various phosphates, tannates, humates, phytates, etc. The zinc complex of this invention can be added as a part of the water component or, if advantageous, can be dispersed in the oil phase of the emulsion system where controlled release may be desired. Because the zinc complex of this invention is strongly alkaline, of itself, over-treatment with caustic soda, which under some conditions gives use to rapid scale formation and consequent higher operation conditions in well drilling, can be reduced or avoided.

While the quantity of zinc complex used will vary widely depending upon individual conditions, it is a rule of thumb that about 3.7 pounds of zinc tetra ammonium carbonate is equivalent to 1 pound of $H_2S$ and, consequently, major amounts are not generally required to remove anticipated quantities of $H_2S$. A probable range may now have less than one pound per barrel of well fluid (as an example of utility) to, in rare instances, twenty to twenty-five pounds per barrel where the packer fluids are left in the well for a long period of time, and gradual accumulation of $H_2S$ down the hole may occur through gas seepage from porous formations or bacterial action, etc.

The effective water solubility of the zinc ammocarb complex of this invention is such that practically instant and complete reaction occurs with any $H_2S$ contamination open to contact with aqueous solutions thereof. Rarely is it necessary to keep work areas safe around a well drilling operation to resort to hydrogen peroxide oxidation of $H_2S$ to elemental sulfur in the pits or areas above the well-head.

The $H_2S$ present in aqueous material to be treated may be determined by a modified Hach method wherein lead acetate treated $H_2S$ test papers after exposure are compared against calibrated color charts. This method is particularly useful when the $H_2S$ content is measured in parts per million.

Texas' well field test data where the ammino carb solutions herein have been tested has not been made available, although favorable commercial interest has been indicated as a result of experimental use in a specific Texas field.

Initial laboratory work involved preparation of a simple well drilling fluid by adding 750 g of Navada Barite to 775 ml of deionized water. The pH was adjusted to 11 with NaOH. A fritted glass dispersion tube was employed to bubble $H_2S$ through the suspension until the pH dropped to 8. The procedure of pH adjustment and $H_2S$ addition was repeated until the synthetic drilling fluid contained 1472 p.p.m. of soluble sulfide ion (4.6 millimoles per 100 grams). The concentration was determined by potentiometric titration with 0.1 M lead perchlorate solution.

The solution of zinc tetra ammonium carbonate scavenger for the $H_2S$ of this invention was prepared by dissolution of a high surface area zinc oxide in a 28% $NH_4OH$ solution (200 ml) containing 200 grams of ammonium carbonate diluted to one liter volume with water. The equations are as follows:

$$ZnO + 2NH_4OH + (NH_4)_2CO_3 \rightarrow Zn(NH_3)_4CO_3 + 3H_2O$$

Zinc is assigned a coordination number of four. Tests indicate that the average coordination number of zinc in the dissolved solutions may be as low as 2.9. It is suggested that a whole series of complex ions exist in solution simultaneously which range from $Zn(NH_3)^{++}$ to $Zn(NH_3)_4^{++}$ and possibly even $Zn(NH_3)_6^{++}$. There appears to be one mole of zinc in solution to one mole of $CO_2$ for an anion of the complex. Purification of the resultant solutions has been found unnecessary for the inventive use and indicates a variety of sources of the zinc ion could be advantageous economically. Principally, the complex aqueously soluble zinc compounds of this invention contain zinc tetra ammonium carbonate.

Aware of the use of insoluble zinc particulate matter for use in drilling fluids, comparisons were run for completeness of removal of corrosive accelerating sulfide from the synthetic mud as prepared above.

One hundred grams of the test drilling fluid prepared as above was admixed with an amount of the zinc ammocarb complex prepared from the zinc oxide as described so that a stoichiometric equivalent of zinc metal ion was present for the sulfide ion captured in the drilling fluid. After one-half hour of stirring at room temperature (72° F.), the liquid portion was recovered by vacuum filtration.

An aliquot portion of the recovered filtrate was stabilized with a sulfur antioxidant buffer (SAOB II), and the residual sulfide present in the filtrate determined with a sulfide specific ion electrode. In Example I, a basic zinc carbonate (Sherwin-Williams—Coffeyville, Kansas); Example 2, the zinc ammocarb complex prepared above; Example 3, a basic zinc carbonate from Milchem, Inc. of Houston, Tex.; and Example 4 a high surface area zinc oxide of about 38 square meters per gram (L No. 2746 of Sherwin-Williams, Kansas). The data obtained is set out in the following Table I.

TABLE I

| | Sulfide in Drilling Fluid before Treatment, ppm | Sulfide after Treatment, ppm | Lead Acetate Test on Prec. Mud |
|---|---|---|---|
| Ex. 1 Basic zinc carb. (Sherwin-Williams, Kansas) | 1472 | 80.4 | Positive |
| Ex. 2 Zinc ammocarb (as above) | 1472 | 3.8 | Negative |
| Ex. 3 Basic zinc carb. (Milchem) | 1472 | 70.5 | Positive |
| Ex. 4 High surface area ZnO | 1472 | 80.4 | — |

From the above Table, it appears that use of the aqueous water soluble zinc complex of this invention is far more effective in sulfide precipitation than the insoluble particle approach depending upon solid surface phase reactions as previously appear proposed in the art.

Having thus described and illustrated my invention, I claim:

1. A process for removal of sulfides in well drilling and packing fluids containing an aqueous phase which has been exposed to sorption of hydrogen sulfide gas which comprises including therein an amount of water soluble zinc ammonium carbonate complex at least stiochiometrically sufficient to precipitate substantially all of said sulfide ion then present in said fluid.

2. The process of claim 1, wherein the water soluble zinc ammonium carbonate complex contains a substantial proportion of zinc tetra ammonium carbonate.

3. The process of claim 2, wherein the water soluble zinc complex is injected down the hole in a drilling operation where the drilling fluid has accumulated a quantity of hydrogen sulfide.

4. A method of prevention of corrosion of well drilling ferrous metal apparatus and detoxification of mud drilling pits contaminated with hydrogen sulfide from the drilling fluid which comprises feeding a metered quantity of an aqueous solution of a zinc ammonium carbonate complex into the circulated well drilling fluids at a rate such as to precipitate the sulfide generated in the drilling operation.

5. A method of removal of hydrogen sulfide gas from gases containing objectionable amounts of said sulfide gas by subjecting said gas to intimate contact and wash with an aqueous solution of a zinc ammonium carbonate complex wherein the complex contains a substantial proportion of zinc tetra ammonium carbonate and recovering said washed gas substantially free from said sulfide gas contaminant.

* * * * *